United States Patent Office 2,746,199
Patented May 22, 1956

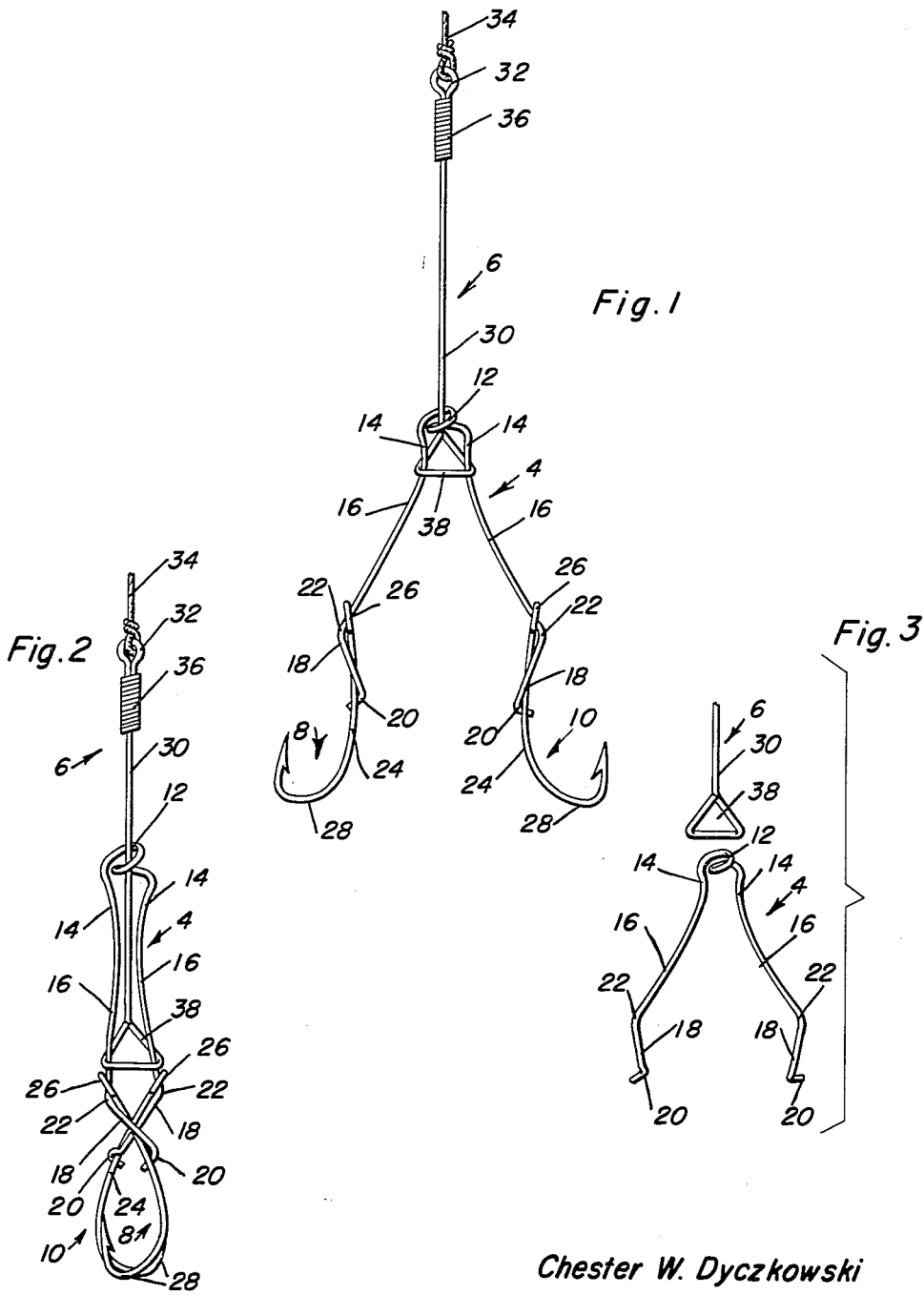

2,746,199

MULTIPLE HOOK FISHING DEVICE

Chester W. Dyczkowski, St. Paul, Minn.

Application June 23, 1954, Serial No. 438,715

1 Claim. (Cl. 43—36)

The present invention relates to a fishing device characterized by expansible and contractible conventional-type fish hooks in overlapping relationship and close together when the device is set for use, and springing apart when the device is tripped.

Fishing devices in the category under consideration are often referred to in a general sense as being pull-actuated, that is when the fish takes the hook and pulls in one direction and the fisherman holds and pulls the line in the other direction, the releasable trip or equivalent means is then brought into play and the fish hooks, there being generally two, are forcibly swung apart and are caused to be embedded in the mouth of the then victimized fish.

The preferred embodiment of the invention has to do with a structurally distinct device which is characterized chiefly by two complemental units; namely, a first unit comprising a length of resilient wire bent between its ends and providing an eye, and a pair of normally coplanar expansible and contractible flexibly resilient limbs joined at the same ends to said eye, the portions of said limbs adjacent to said eye being opposed, close together, and approximately parallel, the intermediate portions of said limbs diverging from said opposed portions and providing camming members, the remaining portions of said limbs being free and normally widely spaced apart to flex toward each other and slightly toed-in toward each other and having outwardly and laterally bent terminal fingers, bends between said diverging portions and said free portions and defining junctional shoulders, and a readily applicable and removable fish hook carried by each limb, each fish hook embodying a rigid shank with an eye at one end and a barbed hook portion at the other end, the shank of each fish hook lying alongside of its companion free limb portion and having its eye encircling the companion cooperating intermediate portion adjacent to the complemental bend and the adjacent terminal finger partially embracing said shank portion, and a second unit comprising a shank slidable through the eye in said first unit and a triangular loop embracing and slidable along said limbs and coacting with said camming members in a manner to compress and flex said limbs together, this in a manner to set the device for use.

Other objects, features and advantages will become more readily apparent from the following description and the accompanying sheet of drawings.

In the drawings, wherein like numerals are employed to designate like parts throughout the views:

Figure 1 is an elevational view of the improved fishing device showing the construction and arrangement of details and illustrating the position of the parts after the device has been sprung to its normal open position.

Figure 2 is a view based on Figure 1 and showing the device with the parts in their ready-to-catch or what is usually referred to as "set" positions.

Figure 3 is an exploded view showing the two principal units with the fish hooks omitted.

Referring now to the drawings the aforementioned two units are referred to in general by the numerals 4 and 6. The complemental conventional type fish hooks are denoted by the numerals 8 and 10 and all four parts are assembled as shown in Figs. 1 and 2.

Referring to Figure 3 the first unit comprises a length of stiff but resilient wire which is bent between its ends to provide an eye 12 and a pair of normally coplanar expansible and contractible flexibly resilient limbs, these being joined at corresponding or their same ends to said eye in the manner shown. The portions of the respective limbs adjacent to said eye may be said to be slightly straight and opposed to each other as at 14—14 in the manner shown more particularly in Fig. 1. The intermediate portions 16—16 are in outwardly diverging relation and these provide what may be conveniently referred to as camming members. The remaining portions of said limbs are widely spaced apart, free and adapted to flex toward each other and are slightly toed-in toward each other in the open positions shown in Fig. 1, said portions being here denoted by the numerals 18—18. They in turn have lateral suitably angled hook-like terminal fingers 20—20. The angular parts 16 and 18 serve to define junctional bends 22—22 which constitute shoulders. The fish hooks are removably or detachably mounted on their respective limbs. Each fish hook comprises a shank 24 with an eye 26 at one end and a barbed hook 28 at the opposite end. The shank is seated or saddled in its complemental hook-like finger 20 and a portion thereof is adjacent to the free end portion 18 and an eye 26 surrounds the camming member or portion 16 where it is held partly in place against displacement by the cooperating shoulder or bend 22.

The member 6 is formed from a single length of wire and comprises a linearly straight shank 30 having an openable and closeable eye 32 for the fishing line 34 which eye is kept closed by the usual sliding type coil spring 36. At the other end of the shank there is a triangular loop 38 provided and this embraces the limbs and slides along the limbs with the shank 30 passing slidably through the assembling and guiding eye 12. Obviously, by catching hold of the unit 4 and pushing the unit 6 in a downward direction, in respect to the views of the drawings, the loop slides along the camming members 16 and presses the same together. In fact, it forces them sufficiently together that the toed-in free end portions 18 swing into crossed or X-shaped relationship. This brings the two hooks 8 and 10 into somewhat overlapping ready-to-strike positions in what may be called the set arrangement seen in Figure 2. Any suitable bait may be utilized. Obviously, when the hooks are taken and a yank is imposed by the fish in a direction to make a get-away the tension on the line signals this condition and by holding the line or perhaps yanking it in a direction away from the pull exerted by the fish, the loop slides back on the camming members and the inherent spring properties serve to spread the limbs apart to the open position shown in Figure 1, whereupon the hooks are obviously embedded in the jaws of the victim-fish.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A pull actuated hook-equipped fishing device characterized by two complemental units, namely: a first unit comprising a length of resilient wire bent between its ends and providing an eye and a pair of normally coplanar expansible and contractible flexibly resilient limbs joined at the same ends to said eye, the portions of said limbs adjacent to said eye being opposed, close together, and approximately parallel, the intermediate portions of said limbs normally diverging from said opposed portions and providing camming members, the remaining portions of said limbs being free and normally widely spaced apart, to flex toward each other and slightly toed-in toward each other and having outwardly and laterally bent terminal fingers, bends between said diverging portions and said free portions and defining junctional shoulders, and a readily applicable and removable fish hook carried by each limb, each fish hook embodying a rigid shank with an eye at one end and a barbed hook portion at the other end, the shank of each fish hook lying alongside of its companion free limb portion and having its eye encircling the companion cooperating intermediate portion adjacent to the complemental bend and the adjacent terminal finger partially embracing said shank, and a second unit comprising a shank slidable through the eye in said first unit, and a triangular loop embracing and slidable along said limbs and coacting with said camming members in a manner to compress and flex said limbs together to set the device for use.

References Cited in the file of this patent

UNITED STATES PATENTS

| | | |
|---|---|---|
| 69,221 | Kidder | Sept. 24, 1867 |
| 321,796 | Clark | July 7, 1885 |
| 807,135 | Smith | Dec. 12, 1905 |
| 2,466,844 | Garner | Apr. 12, 1949 |
| 2,498,612 | Tackett | Feb. 21, 1950 |